April 2, 1946. R. H. GODDARD 2,397,657
CONTROL MECHANISM FOR ROCKET APPARATUS
Filed June 23, 1941 5 Sheets-Sheet 1
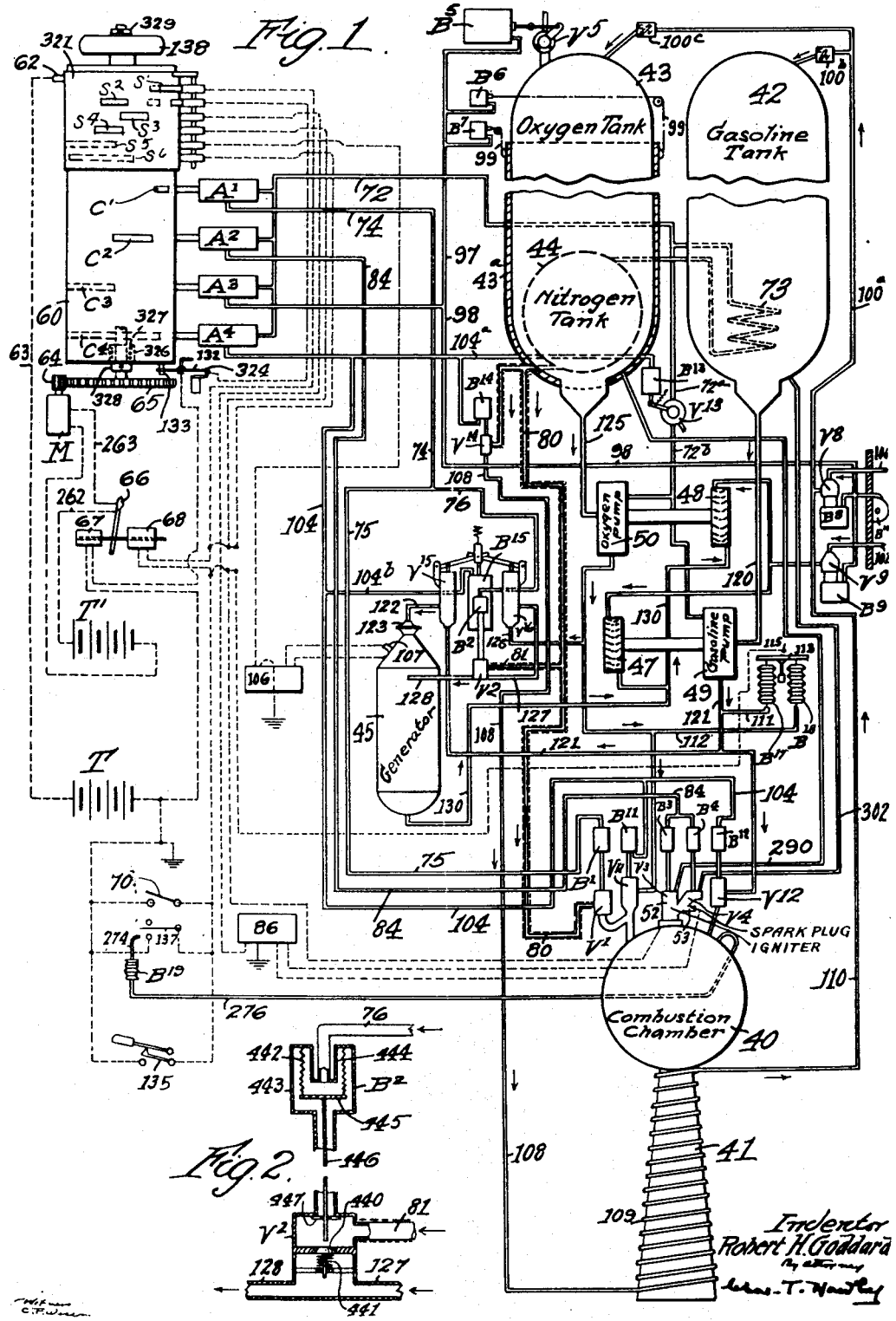

April 2, 1946.   R. H. GODDARD   2,397,657
CONTROL MECHANISM FOR ROCKET APPARATUS
Filed June 23, 1941   5 Sheets-Sheet 2
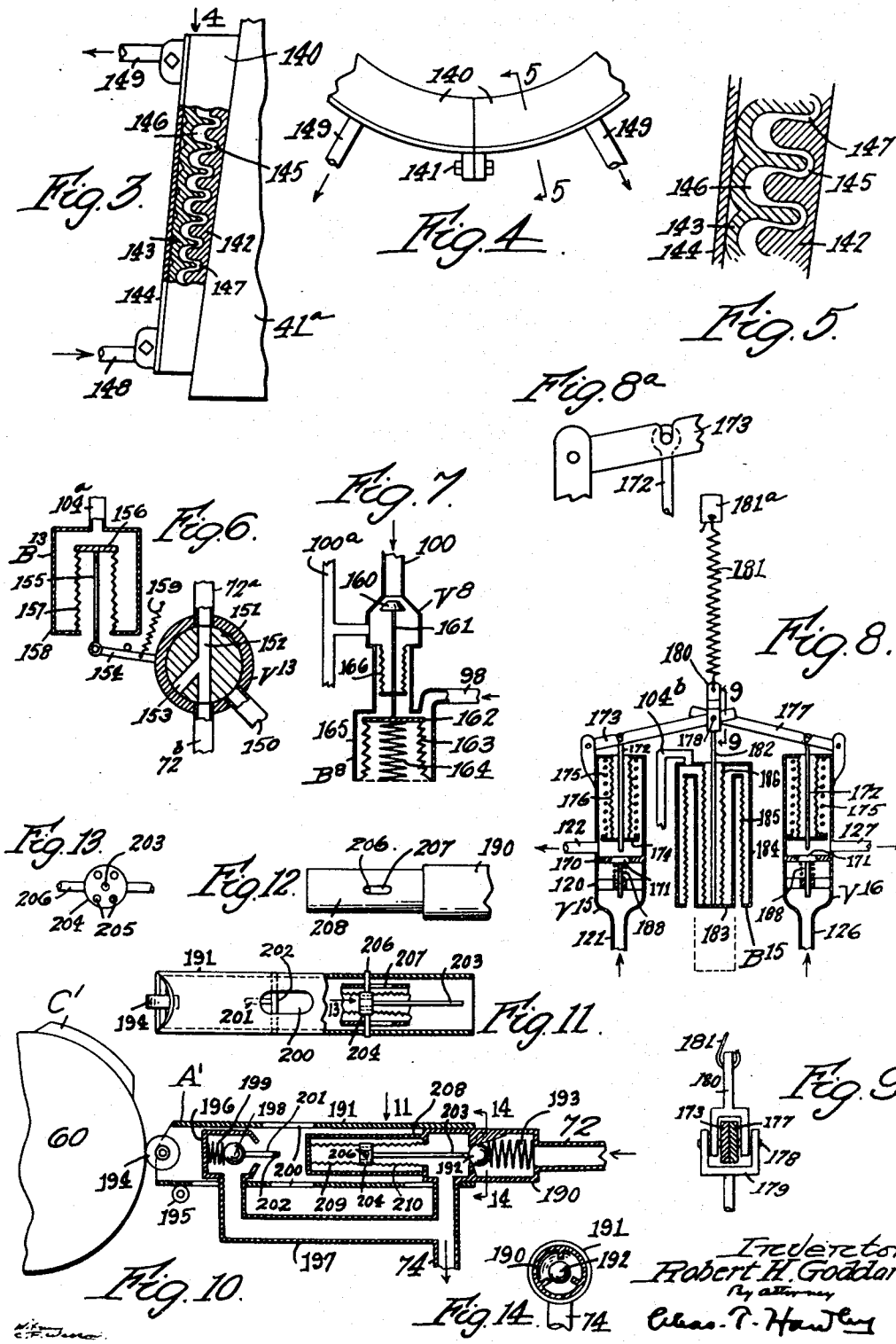

April 2, 1946.  R. H. GODDARD  2,397,657
CONTROL MECHANISM FOR ROCKET APPARATUS
Filed June 23, 1941  5 Sheets-Sheet 3
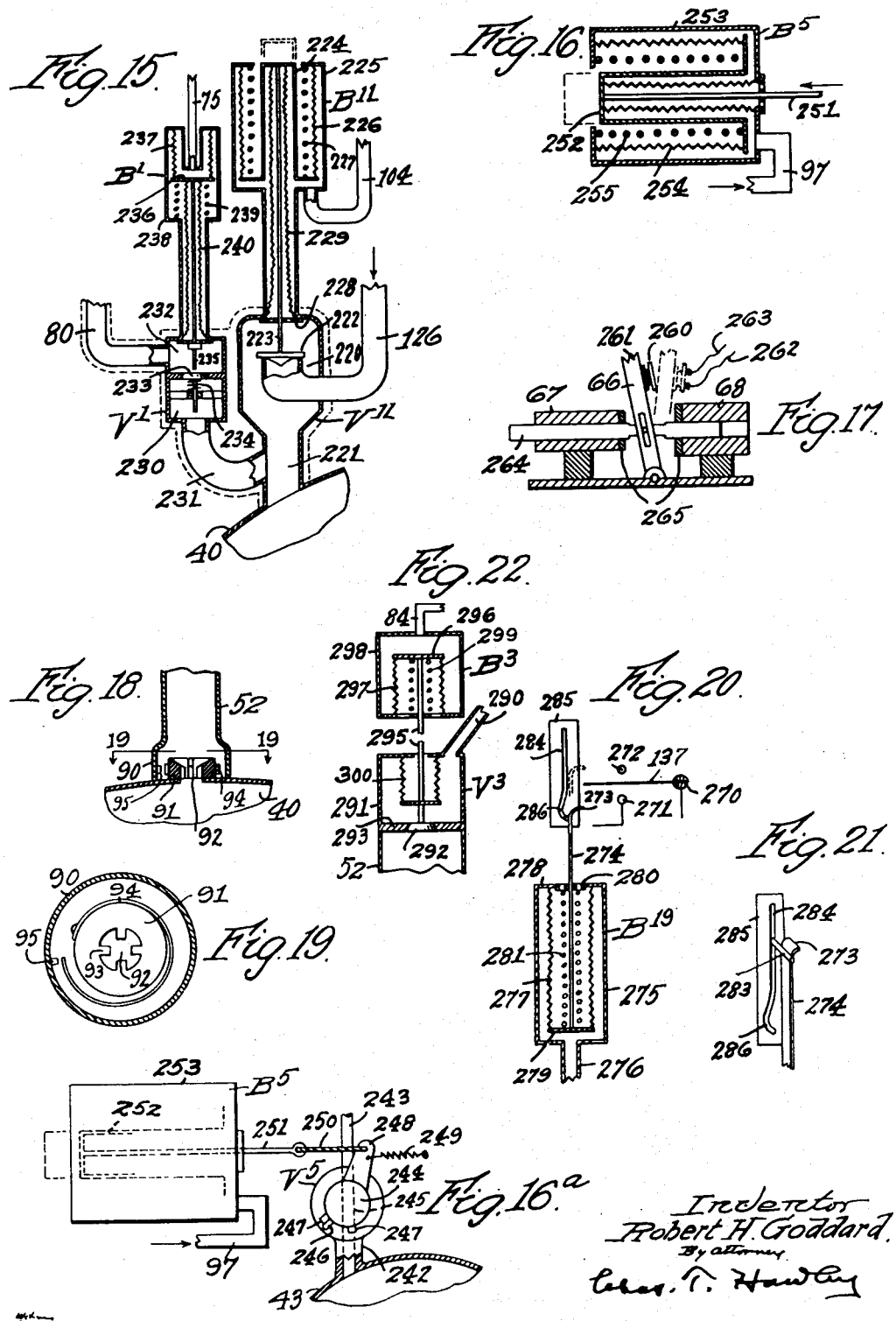

April 2, 1946. R. H. GODDARD 2,397,657
CONTROL MECHANISM FOR ROCKET APPARATUS
Filed June 23, 1941 5 Sheets-Sheet 4
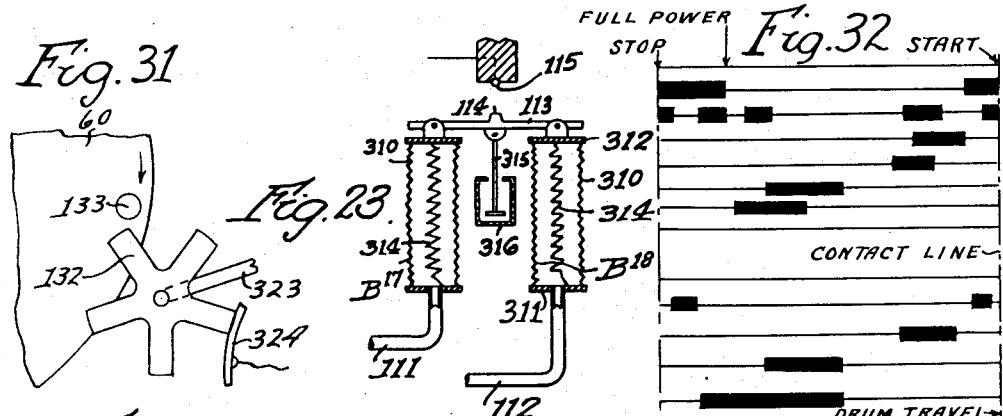
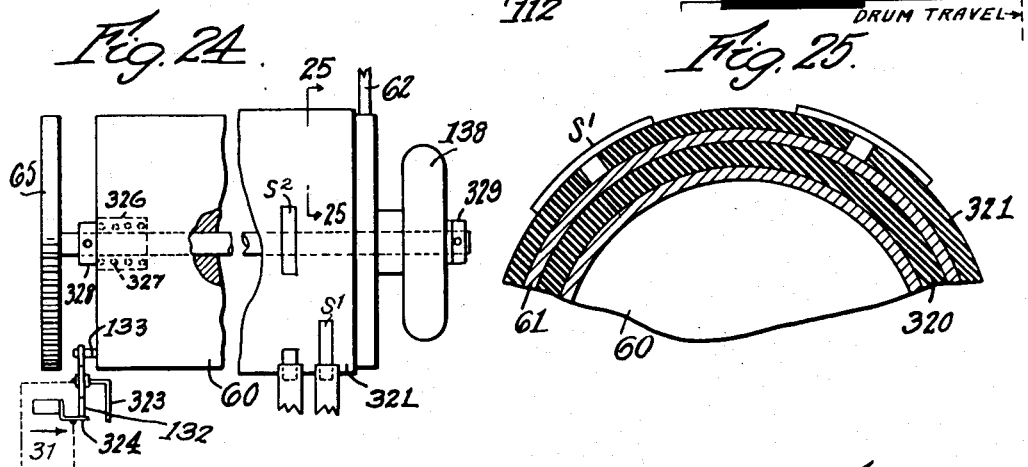
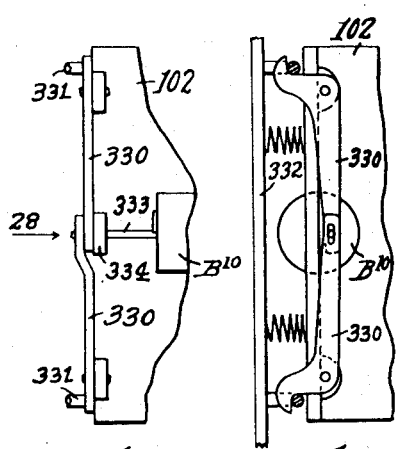
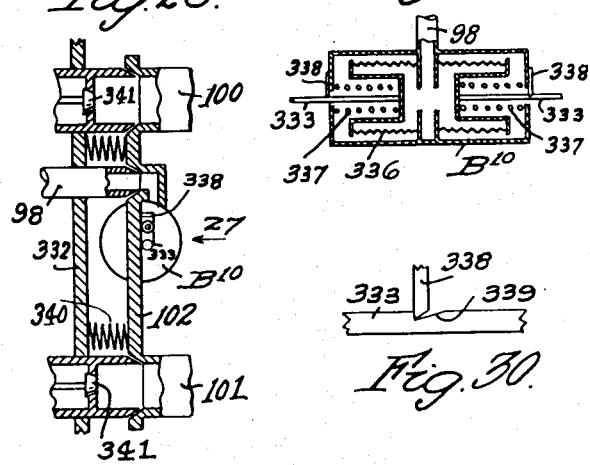
Inventor
Robert H. Goddard
by attorney April 2, 1946.   R. H. GODDARD   2,397,657
CONTROL MECHANISM FOR ROCKET APPARATUS
Filed June 23, 1941   5 Sheets-Sheet 5

Inventor
Robert H. Goddard
By attorney
Chas. T. Hawley

Patented Apr. 2, 1946

2,397,657

UNITED STATES PATENT OFFICE 2,397,657

CONTROL MECHANISM FOR ROCKET APPARATUS

Robert H. Goddard, Roswell, N. Mex., assignor of one-half to The Daniel and Florence Guggenheim Foundation, New York, N. Y., a corporation of New York Application June 23, 1941, Serial No. 399,333

17 Claims. (Cl. 60—35.6)

This invention relates to rockets and rocket craft which are propelled by combustion apparatus using liquid fuel and a liquid to support combustion, such as liquid oxygen. Such combustion apparatus is disclosed in my prior application Serial No. 327,257, filed April 1, 1940.

It is the general object of my present invention to provide control mechanism by which the necessary operative steps and adjustments for such mechanism will be effected automatically and in predetermined and orderly sequence.

To the attainment of this object, I provide control mechanism which will automatically initiate and sustain flight and which will automatically discontinue flight in a safe and orderly manner.

My invention further relates to arrangements and combinations of parts which will be hereinafter described and more particularly pointed out in the appended claims.

A preferred form of the invention is shown in the drawings, in which

Fig. 1 is a diagrammatic view of my improved control mechanism as applied to combustion apparatus of the general type shown in my prior application Serial No. 327,257; and Figs. 2 to 33 inclusive show the detailed construction of numerous specific features of my invention, as follows:

Fig. 2 is a partial sectional side elevation of a nitrogen valve and bellows operator therefor;

Fig. 3 is a partial side elevation of a modified nitrogen vaporizing device in the form of a jacket, and with the jacket partly in section;

Fig. 4 is a partial plan view of the jacket, looking in the direction of the arrow 4 in Fig. 3;

Fig. 5 is an enlarged partial sectional side elevation, taken along the line 5—5 in Fig. 4;

Fig. 6 is a sectional side elevation of a special three-way valve and bellows operator therefor;

Fig. 7 is a sectional side elevation of a valve used with the igniter and of a bellows operator therefor;

Fig. 8 is a sectional side elevation of certain reducing valves used with the gas generator and a bellows operator therefor;

Figure 33:
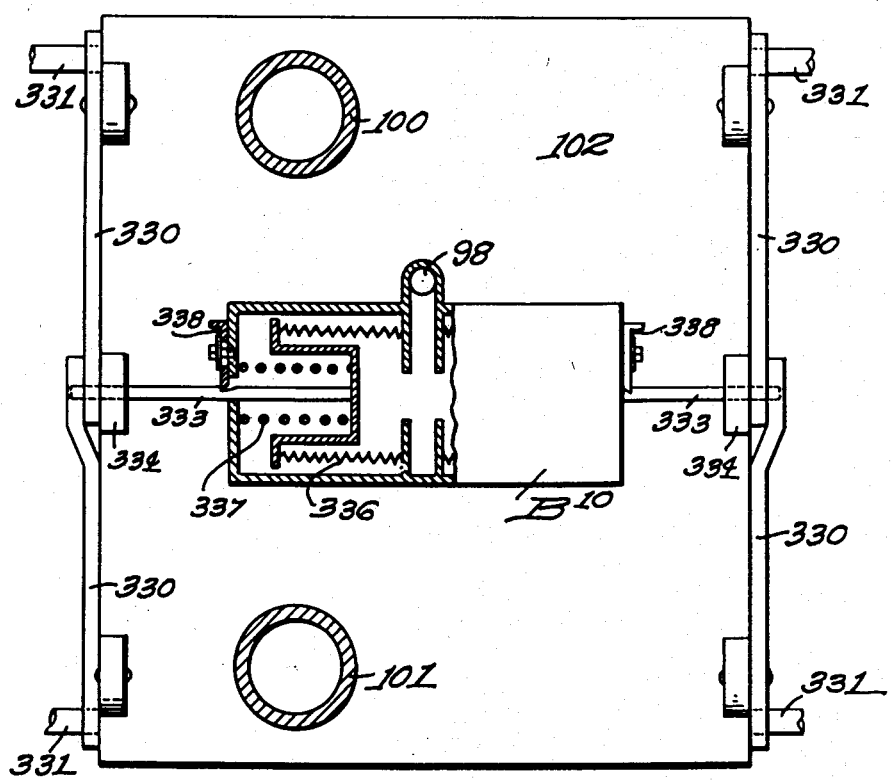

Fig. 8ª is an enlarged detail side elevation of a part shown in Fig. 8;

Fig. 9 is a detail sectional view, taken along the line 9—9 in Fig. 8;

Fig. 10 is a sectional side elevation of one of the cam-operated control valves;

Fig. 11 is a plan view of certain parts thereof, partly in section and looking in the direction of the arrow 11 in Fig. 10;

Fig. 12 is a partial side elevation of an inner member of the valve shown in Fig. 10;

Fig. 13 is an enlarged detail view, looking in the direction of the arrow 13 in Fig. 11;

Fig. 14 is a detail sectional view, taken along the line 14—14 in Fig. 10;

Fig. 15 is a sectional side elevation of a main oxygen valve and a nitrogen rinsing valve, together with bellows operators therefor;

Fig. 16 is a sectional side elevation of a bellows operator to be described;

Fig. 16ª is a side elevation, partly in section, showing a vent valve connected for operation by the bellows operator shown in Fig. 16;

Fig. 17 is a sectional side elevation of a solenoid-operated switch;

Fig. 18 is a sectional elevation of the outlet portion of the igniter and shows a bi-metallic thermal element mounted therein;

Fig. 19 is an enlarged sectional plan view, taken along the line 19—19 in Fig. 18;

Fig. 20 is a side elevation of a circuit-breaking element, with a bellows operator therefor shown in section;

Fig. 21 is a detail perspective view of certain parts of the circuit-breaker shown in Fig. 20;

Fig. 22 is a sectional side elevation of an oxygen valve and bellows operator therefor;

Fig. 23 is a side elevation, partly in section, of a double bellows circuit-closing device;

Fig. 24 is a partial plan view of the control drum, partly in section;

Fig. 25 is a partial transverse section of the control drum, taken along the line 25—25 in Fig. 24;

Fig. 26 is a sectional view of a detachable hose plate, with connections thereto and release mechanism therefor;

Fig. 27 is a partial rear elevation, looking in the direction of the arrow 27 in Fig. 26;

Fig. 28 is a partial side elevation of the hose plate and its locking levers, looking in the direction of the arrow 28 in Fig. 27;

Fig. 29 is a sectional elevation of a bellows operator for releasing said locking lever;

Fig. 30 is a detail side elevation of a latch device to be described.

Figure 34:
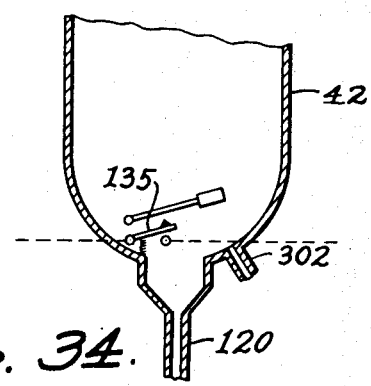

Fig. 31 is an enlarged detail view, looking in the direction of the arrow 31 in Fig. 24;

Fig. 32 is a development of the contact strips and cam segments on the surface of the control drum 60;

Fig. 33 is an enlarged front elevation of the detachable hose plate also shown in Fig. 26, and Fig. 34 is a detail partial sectional view of a storage tank containing a float switch.

Briefly described, the rocket apparatus shown in Fig. 1 comprises a combustion chamber 40 having a nozzle 41 through which the combustion gases are rearwardly discharged to propel the rocket or rocket craft in which the apparatus is mounted.

Storage tanks 42, 43, and 44 are provided for gasoline, liquid oxygen and liquid nitrogen respectively, the nitrogen tank 44 being immersed in the liquid oxygen in the lower part of the oxygen tank 43.

A gas generator 45 supplies gas under pressure to operate turbines 47 and 48, which in turn drive rotary pumps 49 and 50 by which gasoline and liquid oxygen are fed to the combustion chamber 40 and also to the gas generator 45.

Apparatus of the general type above described constitutes the subject matter of a copending application Serial No. 327,257 previously filed by me, and is accordingly not claimed herein.

Gasoline and oxygen are also fed direct from the tanks 42 and 43 to an igniter 52 having a spark-plug 53 by which the mixed gases are fired to provide an igniting flame as combustion is about to be started in the combustion chamber 40. Such an igniter is shown in detail in my prior Patent No. 2,090,039.

The present application relates to automatic control of various devices and connections through which oxygen and gasoline are fed to the generator 45 and combustion chamber 40 and to the control of other devices to be described.

Briefly stated, my improved control mechanism comprises a drum 60 (Fig. 1) having a series of contact strips $S^1$, $S^2$, $S^3$, $S^4$, $S^5$ and $S^6$ and a series of cam segments $C^1$, $C^2$, $C^3$ and $C^4$. The contact strips are insulated from each other but are all connected to a metal shell 61 (Fig. 25) connected by a brush 62 and wire 63 to a battery T or other suitable source of electric power. More than one contact strip, as $S^1$ or $S^2$, may be provided in spaced relation in a single annular path.

The contact strips $S^1$ to $S^6$ engage associated contact brushes in a plurality of electrical circuits, as clearly shown in Fig. 1, and the cam segments $C^1$, $C^2$, $C^3$ and $C^4$ engage and move plungers to render associated three-way valves $A^1$, $A^2$, $A^3$ and $A^4$ operative. These valves control pressure circuits for bellows operators by which numerous valves and switches are shifted in predetermined sequence, as will be hereinafter described.

The drum 60 is rotated by a motor M through a pinion 64 and gear 65, and the motor M is driven from a battery T' or other suitable source of power, to which it is connected through a switch lever 66 actuated by solenoids 67 and 68, the solenoid 68 being substantially stronger. When the smaller solenoid 67 is energized, the switch 66 is opened, but only if the larger solenoid 68 is inactive, and when the larger solenoid 68 is energized, the switch 66 is closed, whether or not the solenoid 67 is also energized.

The electrical circuits controlled by the strips $S^1$ to $S^6$ function briefly as follows:

Strip $S^1$ is in series with the battery T and also with the larger solenoid 68 which closes the switch 66 and starts the drum motor M. $S^1$ coacts with three control switches in parallel, all of which are ineffective when the circuit through $S^1$ is open.

Strip $S^2$ acts through the smaller solenoid 67 to stop the motor M, but only if the larger solenoid 68 is inactive.

Strip $S^3$ controls the activity of the sparkplug 53 in the igniter 52.

Strip $S^4$ controls a motor-starting circuit through the solenoid 68, but only in conjunction with a thermostatic circuit-closer in the igniter 52.

Strip $S^5$ controls the activity of a sparkplug 107 in the generator 45; and

Strip $S^6$ controls a motor-starting circuit through the larger solenoid 68, but only in conjunction with a circuit-closing device responsive to the pressures in the main oxygen and gasoline feed lines.

The general cycle of operations controlled by the drum 60 through the contact strips $S^1$ to $S^6$ and cam segments $C^1$ to $C^4$ will now be described, after which the more specific construction of the numerous special devices included in the control mechanism will be described in detail and with special reference to Figs. 2 to 32 inclusive. The development of the drum 60 and associated contact strips and cam segments as shown in Fig. 32 will be found helpful in following the sequence of operations as described in the following pages.

In starting position, the contact strips $S^1$ and $S^2$ engage their associated brushes. When it is desired to start combustion in the combustion chamber 40, a switch 70 (Fig. 1) is moved to close a circuit from the batery T through the switch 70, solenoid 68, contact strip $S^1$ and wire 63 back to the battery T. The solenoid 68 is thus energized, shifting the switch 66 to close the operating circuit between the motor M and the battery T'. The motor M thereupon starts the drum 60 in rotation.

Friction devices are provided for the solenoid plunger, which hold the switch 66 in either open or closed position until positively moved therefrom, the details of this mechanism being shown in Fig. 17 and to be described.

As soon as the drum 60 starts to turn, the contact strip $S^2$ moves out of engagement with its brush to de-energize the solenoid 67, and the cam segment $C^1$ opens the three-way valve $A^1$, the construction of which is shown in detail in Figs. 10 to 14 and will be hereinafter described.

A pipe 72 is connected at one end to each of the control valves $A^1$, $A^2$, $A^3$ and $A^4$, and at the opposite end is connected through a coil 73 to the nitrogen tank 44. The coil 73 is immersed in the gasoline in the tank 42, which warms the nitrogen sufficiently so that any drops in the nitrogen gas will be vaporized in passing through the coil. If the liquid oxygen in the tank 43 is at atmospheric pressure, the vapor pressure of the nitrogen in the tank 44, coil 73 and pipe 72 will be approximately forty-five pounds.

When the valve $A^1$ is opened by the cam segment $C^1$, nitrogen gas under pressure will flow through the pipe 74 and branch pipes 75 and 76 to bellows operators $B^1$ and $B^2$ respectively, which in turn open nitrogen rinsing valves $V^1$ and $V^2$. The valve $V^1$, when opened, admits liquid nitrogen from the tank 44 through a jacketed pipe 80 to the connections between the main oxygen valve $V^{11}$ and the chamber 40, and the valve $V^2$ admits nitrogen from the branch jacketed pipe 81 to the oxygen connection to the generator 45, thus clearing out any possibly explosive mixture of gases which might have accumulated in said connections. The detailed construction of these rinsing valves and their operating mechanism is shown in detail in Figs. 2 and 15 and will be later described.

The cam segment $C^1$ is short and allows only a small amount of liquid nitrogen to enter the connections of said oxygen valves, and this small amount of liquid nitrogen is quickly vaporized. The pipes 80 and 81 are jacketed to make certain that liquid rather than gaseous nitrogen enters the rinsing valves $V^1$ and $V^2$, as a corresponding amount of gaseous nitrogen would be insufficient to clear the connections.

This injected nitrogen serves the important purpose of diluting and ejecting from the combustion chamber 40 and generator 45 any explosive mixture of gasoline and oxygen or gasoline and air which might have been caused by leaky fuel valves.

Cam segment $C^1$ then leaves control valve $A^1$ and allows the rinsing valves $V^1$ and $V^2$ to close. Contact strip $S^1$ also moves from its brush and opens the circuit of the larger solenoid 68 but the switch 66 is held closed by friction.

As soon as the control valve $A^1$ is allowed to close by removal of cam segment $C^1$, the cam segment $C^2$ opens the control valve $A^2$. This admits gas under pressure through the pipe 84 to bellows operators $B^3$ and $B^4$ which control oxygen and gasoline valves $V^3$ and $V^4$ respectively in the igniter 52. The detailed construction of one of the bellows operators $B^3$ and $B^4$ and one of the valves $V^3$ and $V^4$ is shown in Fig. 22 to be described.

The specific construction of the igniter 52 forms no part of my present invention and the igniter may be similar to that shown in my prior Patent No. 2,090,039. For the present, it is sufficient to state that when pressure is applied to the bellows operators $B^3$ and $B^4$, the oxygen and gasoline valves $V^3$ and $V^4$ are opened and oxygen and gasoline flow into the igniter 52, where they mix and are ignited by the sparkplug 53. A thermostatic control device associated with the igniter 52 is shown in detail in Figs. 18 and 19 and will be later described.

At about the same time that the control valve $A^2$ is opened by cam segment $C^2$, the contact strip $S^3$ completes a circuit through a primary spark coil 86, the secondary of which has a grounded connection with the sparkplug 53, thus energizing the sparkplug and starting the igniter 52 in operation.

The drum 60 is allowed to turn long enough to make certain that the oxygen and gasoline valves $V^3$ and $V^4$ and the sparkplug 53 in the igniter 52 are all in effective operation. A second contact strip $S^2$ then closes the circuit through the small solenoid 67 and battery T, thus energizing the small solenoid and opening the switch 66 (the solenoid 68 having been previously deenergized by breaking the contact on the strip $S^1$).

The drum 60 then remains at rest for a sufficient length of time to insure that an effective flame is produced by the igniter 52 and is projected into the combustion chamber 40.

As the feeding devices used in my apparatus produce an extremely intimate mixture of gasoline and oxygen as soon as the liquids enter the chamber 40, it is desirable that the mixture be ignited as promptly as possible to avoid risk of explosion. For this reason I provide a special construction to scatter or spread the flame widely in the interior of the chamber 40, which construction is shown in detail in Figs. 18 and 19.

The outlet of the igniter 52 (Fig. 18) is enlarged as shown at 90 to receive a member 91 having an axial opening 92 (Fig. 19) into which project a plurality of spiral or inclined vanes 93. A portion of the flame passes directly through the center of the openings 92, while other parts of the flame are deflected by the vanes 93 so that they are spread or scattered widely in the combustion chamber. The igniter and member 92 are grounded.

A bi-metallic strip 94 is fixed at one end to the outside of the member 91 and is disposed in the angular recess between said member and the enlarged end portion 90 of the igniter 52. When the igniter is cold, the strip 94 contracts so that the free end of the strip is out of engagement with an insulated contact stud 95 (Fig. 19).

Before the drum 60 was stopped by the strip $S^2$, the contact strip $S^4$ had established a partially completed circuit through the large solenoid 68, which circuit is completed when the bi-metallic strip 94 expands and engages the contact 95. The solenoid 68 then overcomes the smaller solenoid 67 and closes the switch 66, again starting the drum 60 when the igniter is completely operative and the flame sufficiently intense.

Contact strip $S^3$ then moves out of engagement and breaks the spark-plug circuit for the igniter 52, as the spark is no longer needed.

The circuit through the strip $S^2$ and small solenoid 67 is then quickly opened, after which the strip $S^4$ moves out of contact with its brush, deenergizing solenoid 68 but leaving the drum 60 in rotation.

The cam segment $C^3$ then opens the control valve $A^3$, which allows gas under pressure to flow through pipes 97 and 98 to a plurality of bellows operators controlling valves and other devices which will now be described.

The pipe 97 (Fig. 1) connects to a bellows operator $B^5$ shown in detail in Fig. 16 and operative to close a vent valve $V^5$ (Fig. 16ª) on the oxygen tank 43. The valve $V^5$ is normally open but is closed by a pull of the operator $B^5$. The detailed construction of the operator $B^5$ and valve $V^5$ is shown in Figs. 16 and 16ª and will be later described.

The pipe 97 (Fig. 1) also connects to bellows operators $B^6$ and $B^7$ effective through cords 99 to release the latches which hold a felt casing 43ª about the lower portion of the oxygen tank. The construction of the bellows operators $B^6$ and $B^7$ is similar to that of operator $B^5$ and is shown in detail in Fig. 16 (to be described). The latches and felt segments which cover the lower part of the oxygen tank 43 are shown in detail in my prior application Serial No. 327,357.

Pressure in the branch pipe 98 simultaneously actuates a bellows operator $B^8$ to open a valve $V^8$ by which nitrogen gas at low pressure from a hose 100 is admitted to the tanks 42 and 43 through a pipe 100ª and check valves 100ᵇ and 100ᶜ before the machine is placed in full operation.

The pipe 98 also connects to a bellows operator $B^9$ by which a valve $V^9$ is opened to admit high external air pressure from a hose 101 to the turbines 47 and 48 which operate the pumps 49 and 50. The details of one of the operators $B^8$ and $B^9$ and of one of the valves $V^8$ and $V^9$ are shown in detail in Fig. 7 (to be described).

The pipe 98 (Fig. 1) also has a connection to a bellows operator $B^{10}$ (Fig. 29) on a detachable hose plate 102, full details of which are shown in Figs. 26 to 30 and will be later described. For present purposes, it is sufficient to state that when pressure is applied through the pipe 98, the bellows operator $B^{10}$ acts in such a manner that certain pins holding the hose are first unlatched, so that they will be withdrawn and the plate will be detached as soon as pressure in the pipe 98 and operator $B^{10}$ is thereafter discontinued.

A cam segment $C^4$ on the drum 60 opens the control valve $A^4$ (Fig. 1) at about the same time that the control valve $A^3$ is opened by cam segment $C^3$. The valve $A^4$ is connected through a pipe 104 to bellows operators $B^{11}$ and $B^{12}$ which control the main oxygen valve $V^{11}$ and the main gasoline valve $V^{12}$. When the control valve $A^4$ admits pressure to the pipe 104, the normally closed main oxygen and gasoline valves $V^{11}$ and $V^{12}$ are opened. The construction of one of these operators and valves is shown in Fig. 15 (to be described).

Shortly after the main valves $V^{11}$ and $V^{12}$ are opened, cam segment $C^2$ allows control valve $A^2$ to close, and the gasoline and oxygen feed to the igniter 52 is thereby discontinued. The thermostat device 94 then cools off quickly and thereafter the $S^4$ circuit is maintained open.

Pressure in a branch pipe 104ª actuates an operator $B^{13}$ to shift a three-way valve $V^{13}$ to relieve the nitrogen pressure exerted from the pipe 72ª through the connection 72ᵇ to the bearings of the pumps 49 and 50, and to connect said bearings to the atmosphere.

The details of the three-way valve $V^{13}$ are shown in Fig. 6 (to be described). The pump bearings, per se, form no part of the present invention and may be constructed as shown in detail in my prior Patent No. 2,281,971, dated May 5, 1942.

Simultaneously with the opening of the control valve $A^4$ by the cam segment $C^4$, a contact strip $S^5$ is engaged and energizes the primary of a spark coil 106, the secondary of which is connected to a spark-plug 107 in the gas generator 45.

Pressure in a branch pipe 104ª (Fig. 1) additionally actuates a bellows operator $B^{14}$ to open a valve $V^{14}$ which allows liquid nitrogen to flow from the nitrogen tank 44 through a pipe 108 to a coil 109 which surrounds the nozzle 41 and thence through pipes 110 and 100ª to the supply tanks 42 and 43. The liquid nitrogen is evaporated by heat from the nozzle, thus supplying gas at a vapor pressure of some forty-five pounds for the tanks 42 and 43. The operator $B^{14}$ and valve $V^{14}$ are similar in construction to the operator $B^{11}$ and valve $V^{11}$ previously described and shown in detail at the right in Fig. 15.

The control valve $A^4$ also admits pressure through a branch pipe 104ᵇ (Fig. 1) to the upper end of a bellows operator $B^{15}$ which controls valves $V^{15}$ and $V^{16}$ in the gasoline and oxygen feed lines for the generator 45.

The details of construction of the bellows operator $B^{15}$ and of the valve $V^{15}$ and $V^{16}$ are shown in Fig. 8 and will be hereinafter described, but for the present it is sufficient to state that admission of pressure through the pipe 104ᵇ opens the valve $V^{15}$, so that gasoline may flow from the gasoline tank 42 through the pipe 120, pump 49, pipe 121, the valve $V^{15}$, pipe 122 and strainer 123 to the upper end of the generator 45.

At the same time, the pressure in pipe 104ᵇ opens the valve $V^{16}$ and allows oxygen to flow from the tank 43 through a pipe 125, pump 50, pipe 126, valve $V^{16}$, pipe 127, valve $V^2$ and pipe 128 to the generator 45, the pipe 128 entering the generator tangentially as shown in Fig. 1. The valves $V^{15}$ and $V^{16}$ also serve as reducing valves and control admission pressures for the generator 45.

As the sparkplug 107 has been energized by contact of strip $S^5$, the mixture of gasoline and oxygen will be ignited in the generator 45, developing heat and pressure and vaporizing excess oxygen gas under pressure, which gas is delivered to the turbines 47 and 48 through a pipe 130 and thereafter maintains the turbines 47 and 48 and pumps 49 and 50 in operation.

As soon as the parts last described are in effective operation, a third contact strip $S^2$ makes contact and again energizes the small solenoid 67, opening the switch 66 and stopping the motor M and drum 60 until the pressures in the pumps 49 and 50 have risen to the full working amount. The larger solenoid 68 was previously rendered inactive by breaking the circuit through $S^4$.

The pumps 49 and 50 are connected through branch pipes 111 and 112 (Fig. 1) to bellows operators $B^{17}$ and $B^{18}$ (Fig. 23) respectively and these operators jointly control a switch lever 113 having a contact 114 adapted to engage a fixed contact 115. The lever 113 is grounded and such engagement completes the circuit through the large solenoid 68 and the contact strip $S^6$ which is at this time engaged with its associated brush. This starts the motor M in further rotation.

The provision of the bellows operators $B^{17}$ and $B^{18}$ for the switch lever 113 insures that the external starting pressure will be definitely supplied to the turbines 47 and 48 until the pressures in both pumps 49 and 50 and in the gas generator 45 are high enough to permit discontinuance of the starting pressure.

Further rotation of the drum 60 now removes the cam segment $C^3$ from engagement with the control valve $A^3$. This rotation of the drum 60 also removes the contact strip $S^5$ from its associated brush, which opens the main sparkplug circuit, no longer needed. The contact strip $S^6$ then passes out of brush engagement, opening the circuit of solenoid 68, and the contact strip $S^1$ and an additional contact strip $S^2$ are then engaged, the latter energizing the small solenoid 67, which opens the switch 66 and stops the motor. The engagement of $S^1$ is preliminary only.

The drum 60 will now remain stationary, even if the contact with the double bellows operated switch at 115 remains closed, as the strip $S^6$ no longer engages its associated brush and the circuit for the larger solenoid 68 through 115 is thus open at $S^6$.

When the control valve $A^3$ is closed by removal of $C^3$, pressure is relieved in the bellows operator $B^{10}$ for the hose plate 102, thus releasing the hose plate and allowing the same to be disassociated from the rocket craft.

The rocket motor is now under full power and will continue to operate as described in detail in my prior application Serial No. 327,257, until it is stopped manually or by exhaustion of fuel or by some accidental occurrence.

The apparatus may be brought to inoperative condition manually by again momentarily closing the switch 70. This first energizes the large solenoid 68 through strip $S^1$, previously contacted. Solenoid 68 then overcomes the small solenoid 67 and closes the switch 66, thus starting the drum 60 through a small forward movement, during which the circuit through contact strip $S^2$ and solenoid 67 is broken by disengagement of $S^2$ and its brush, and the cam segment $C^4$ moves along and allows the control valve $A^4$ to close.

Closing of the control valve $A^4$ releases pressure in the pipe 104 and branch pipes 104$^a$ and 104$^b$ and this allows the main oxygen valve $V^{11}$, the main gasoline valve $V^{12}$ and the main nitrogen valve $V^{14}$ to close and also allows the three-way valve $V^{13}$ to shift and admit pressure to the pump seals, thereby stopping and sealing the pumps.

A slight further rotation of the drum causes a second cam segment $C^1$ to open the control valve $A^1$ momentarily, thus admitting liquid nitrogen through the rinsing valves $V^1$ and $V^2$ to the combustion chamber 40 and to the generator 45 and thereby extinguishing combustion in the chamber and generator. $C^1$ then leaves $A^1$ and the valves $V^1$ and $V^2$ close.

The manually controlled switch 70 is now released, if not previously released, rendering solenoid 68 inactive. The contact strip $S^1$ and its associated brush remain in preliminary contact, however, so that the drum may be ready for a new cycle of operation.

The initial contact strip $S^2$ then engages its brush, causing current to pass through the small solenoid 67 and open the switch 66, thus bringing the drum to rest.

A star wheel switch 132 (Figs. 24 and 31) is then opened, preferably by a pin 133 on the end of the drum 60 which engages a part of the star wheel as the drum stops. The details of this switch are shown in Figs. 24 and 31 and will be later described. The control circuit through the solenoid 67 is thus broken but the switch 66 is left open. When the mechanism is again started by closing the hand switch 70, the pin 133 will advance the star wheel switch 132 to normal closed position.

If one of the fuel tanks becomes substantially empty, a float lever in a switch 135 (Fig. 34) will move downward by gravity and cause a pair of normally separated contacts in said switch to engage and close the circuit through the larger solenoid 68 (as above described for the hand switch 70) and will bring the apparatus to rest in the same manner as is effected by momentarily closing said hand switch. Such a float switch is shown and described in my copending application Serial No. 327,257 and the details thereof form no part of my present invention.

In case of accident to the apparatus, the pressure in the combustion chamber 40 will naturally fall off, allowing a pressure-controlled switch 137 (Fig. 1) to close and bring the drum 60 to rest, the same as occurs when the switch 70 is manually closed. The details of construction of the switch 137 and the bellows operator $B^{19}$ therefor are shown in detail in Figs. 20 and 21, to be described.

If the drum 60 is stopped between its initial and final position, it may be restored to initial position by turning the drum 60 backward by use of the hand wheel 138 (Figs. 1 and 24). Special provision to be described is made to permit shifting the drum axially during such backward movement, so that the contact strips and cam segments will be out of alignment with their coacting elements during backward movement of the drum. The control circuits through the strips $S^1$ and $S^2$ are thus all open and the control valves $A^1$ to $A^4$ are all closed. The shift is accomplished by mechanism shown in Fig. 24.

Having described the general construction and method of automatic operation of my improved control mechanism, I will now describe the specific construction of the detail features shown in Figs. 2 to 30 inclusive.

Fig. 2 is a sectional elevation of the nitrogen rinsing valve $V^2$ and bellows operator $B^2$ for the oxygen connection to the generator 45. Under normal conditions, oxygen is present in the oxygen supply pipe 127 and in the generator connection 128 and also in the lower portion of the valve $V^2$ below the valve member 440, which valve member is normally pressed upward to closed position by a spring 441.

When it is desired to rinse the valve $V^2$ and generator connection 128, nitrogen gas from the supply pipe 81 is admitted by depressing the valve member 440. The bellows operator $B^2$ is provided for this purpose and consists of a bellows member 442 mounted within a casing 443 having a reentrant portion 444 to which one end of the pipe 76 is connected. The lower end of the bellows member 442 is closed by a plate 445 to which is secured a plunger 446, the lower end of which slides freely through a guide-plate 447 in the upper part of the valve $V^2$. When pressure is admitted through the pipe 76 by operation of the control valve $A^1$, the plate 445 and plunger 446 are depressed far enough so that the plunger engages the valve member 440 and opens the valve $V^2$ to admit nitrogen to rinse said valve $V^2$ and the connection 128 to the generator 45.

In Figs. 3, 4 and 5, I have shown a modified nitrogen vaporizing device, which may be desirably substituted under some circumstances for the coil 109 (Fig. 1) which surrounds the nozzle 41. In the modified construction, the liquid nitrogen is vaporized in a jacket structure made up of box-like segments 140 (Fig. 4) snugly fitting the outside of the nozzle 41$a$ (Fig. 3) and secured together by bolts 141.

Each segment comprises an inner member 142 and an outer member 143 which is mounted on a cover plate 144. The adjacent faces of the inner and outer members 142 and 143 are corrugated, as clearly shown in Figs. 3 and 5, and are spaced apart to provide a curved and recurved passage 145 having enlarged portions 146 and relatively narrow connecting portions 147.

Liquid nitrogen is fed to the jacket space or passage 145 through a pipe 148 near the lower or open end of the nozzle 41$a$ and nitrogen gas is discharged from the jacket through a pipe 149 connected into the jacket space 145 at its upper end.

The provision of the alternating enlarged spaces 146 and narrow connecting channels 147 causes the partially vaporized nitrogen to travel more rapidly through the narrow portions 147 so that drops of liquid nitrogen are thrown by centrifugal force against the more highly heated corrugated wall of the inner member 142 where they are quickly vaporized. In the enlarged portions 146, the nitrogen travels at reduced speed and with less centrifugal effect, so that the drops are not thrown outward against the cooler corrugated surface of the outer member 143. It will be noted that the curved passages increase in cross section toward the upper end of the jacket, thus providing more space for the increasing amount of nitrogen gas.

This modified construction gives more rapid evaporation and an increased production of nitrogen gas, as compared with the coil 109 shown in Fig. 1.

Fig. 6 shows the details of construction of the bellows operator $B^{13}$ and three-way valve $V^{13}$ which control the connection between the nitrogen pressure pipe 72ᵃ and the connection 72ᵇ to the sealing devices in the bearings of the pumps 49 and 50. The valve V¹³ has ports for the pipe 72ᵃ and connections 72ᵇ and a third port by which the valve is vented to the atmosphere through a pipe 150. The rotary valve member 151 has a straight passage 152 and a branch passage 153. The valve member 151 is also provided with an arm 154 connected to a plunger 155 secured to a plate 156 mounted at the upper end of a bellows member 157 in the bellows operator B¹³.

A casing 158 surrounds the member 157 and the pipe 104ᵃ from the control valve A⁴ is connected to the upper end of said casing 158. A spring 159 normally holds the valve member 151 in the position shown in Fig. 6, with pressure from the pipe 72ᵃ acting through the connections 72ᵇ to seal and lock the pumps.

When the control valve A⁴ is opened, pressure is applied in the bellows operator B¹³, depressing the plunger 155 and arm 154 and turning the valve member 151 so that the branch passage 153 is aligned with the connection 72ᵇ and so that the lower end of the passage 152 is aligned with the vent opening 150. The upper end of the passage 152 is blocked off and the pressure pipe 72ᵃ is also blocked off. The pressure in the pump bearings and seals is thus relieved as the pumps are placed in operation through the action of the control valve A⁴.

Fig. 7 shows the detail structure of the bellows operator B⁸ and valve V⁸ which control admission of nitrogen gas at low pressure to the supply tanks 42 and 43 before the machine is placed in full operation. The valve V⁸ has a valve member 160 which controls the flow of nitrogen from the supply pipe or hose connection 100 to the pipe 100ᵃ which connects to the supply tanks 42 and 43 shown in Fig. 1. The valve member 160 is mounted at the end of a plunger 161 supported on a plate 162 forming the inner end of a bellows member 163. A spring 164 normally holds the valve member 160 in raised position and the valve V⁸ closed.

The bellows member 163 forms a part of the bellows operator B⁸ and is mounted in a casing 165 to which is connected the pressure pipe 98 controlled by the valve A¹. A bellows packing 166 is interposed between the valve V⁸ and operator B⁸ to prevent leakage. When the control valve A¹ is opened to admit pressure to the pipe 98, the valve member 160 is depressed and low pressure nitrogen gas from the pipe 100 is admitted through the pipe 100ᵃ (Fig. 1) and check valves 100ᵇ and 100ᶜ to the supply tanks 42 and 43.

Fig. 8 is a sectional view of the reducing valves V¹⁵ and V¹⁶ which control the flow of gasoline and oxygen respectively to the generator 45, together with a bellows operator B¹⁵ therefor.

The valve V¹⁵ comprises a casing 120 having the gasoline supply pipe 121 connected to its lower end and the gasoline generator connection 122 connected above a partition 170 providing a seat for a valve member 171, which is normally held closed by pressure in the pipe 121. A plunger 172 has a pin and slot connection (Fig. 8ᵃ) at its upper end to a lever 173 and has its lower end secured in a movable guide-plate 174. A spring 175 tends to move the plunger downward and a bellows packing 176 seals the opening through which the plunger extends upward to the lever 173.

The valve V¹⁶ is of a construction identical with the valve V¹⁵ and is connected at its lower end to the oxygen supply pipe 126 and at its side to the oxygen generator feed pipe 127. The plunger in the valve V¹⁶ is connected to a lever 177 corresponding to the lever 173 previously described.

The free ends of the levers 173 and 177 cross and have a slotted connection by a pin 178 (Fig. 9) to an outer yoke 179 and an inner yoke 180. A spring 181 is connected at its lower end to the inner yoke 180 and at its upper end to a fixed element 181ᵃ. The outer yoke 179 is connected by a rod 182 to the lower closed end of a cylinder 183 forming part of the bellows operator B¹⁵.

The cylinder 183 is located within the casing 184 of the bellows operator B¹⁵ and is connected to said casing by a larger outer bellows member 185 and by a smaller inner bellows member 186. The pressure pipe 104ᵇ from the control valve A⁴ is connected to the upper end of the casing 184.

When the control valve A⁴ is closed and the pipe 104ᵇ is vented, the spring 181 acts through the levers 173 and 177 to raise the plungers 172 in the valves V¹⁵ and V¹⁶ against the springs 175 and to allow the valve members 171 to be closed by the pressures in the pipes 121 and 126 and also by springs 188.

When the control valve A⁴ is opened, pressure in the pipe 104ᵇ will force the inner cylinder 183 of the operator B¹⁵ downward, moving the slotted levers 173 and 177 downward away from the upper ends of the plungers 172 and thus leaving the plungers under the control of the regulating springs 175. The plungers will then move downward, opening the valves V¹⁵ and V¹⁶ and holding the valves open until the pressure in the pipe 122 or 127 overcomes the corresponding spring 175 and force the associated plunger 172 upward, thus allowing the valve to close.

Regulated reduced pressure is thus maintained in the pipes 122 and 127 under control of the springs 175 as long as the control valve A⁴ is open. As soon as the control valve A⁴ closes, the spring 181 overcomes the springs 175 and holds the plungers 172 raised so that the valve members 171 will close.

In Figs. 10 to 14 I have shown the construction of the control valve A¹, which is identical with the construction of the valves A², A³ and A⁴.

The pressure supply pipe 72 is connected to a fixed inner casing 190 on which a cylindrical outer casing or sleeve 191 is slidable. A ball valve 192 is normally held in closed position by a spring 193 and prevents flow of gas under pressure to the control pipe 74. The outer sleeve 191 is provided at its rear end with a cam roll 194 adapted to be engaged by a cam segment C¹ on the drum 60. A fixed guide-roll 195 offsets the side thrust of the cam segment C¹ on such engagement and facilitates sliding movement of the sleeve 191.

The fixed cylinder 190 has a longitudinally separated inner chamber 196 supported by a branch vent pipe 197 which connects into the control pipe 74. The chamber 196 has a vent port adapted to be closed by a ball valve 198 actuated by a spring 199. When the valve 198 is open, the pipes 74 and 197 are vented to the atmosphere through slots 200 in the outer sleeve 191.

A stud 201 (Fig. 11) is mounted on a cross-pin 202 carried by the outer sleeve 191. When the roll 194 is not engaged by a cam segment C¹, the pin 201 engages the ball vent valve 198 and vents the pipes 74 and 197, but when the roll is engaged by a cam segment, the pin 201 moves to the right in Fig. 10 and the vent valve 198 closes.

The second pin 203 (Fig. 11) is mounted in a disc 204 which is perforated as indicated at 205 (Fig. 13) and which is supported on a cross-pin 206, also secured in the outer sleeve 191 and movable axially in slots 207 in a reduced extension 208 of the fixed inner casing 190. Bellows packings 209 and 210 connect the disc 204 at each side to the fixed inner casing 190, and the pressure at the opposite sides of the disc are equalized through the perforations 205.

With this construction, a small movement of the outer sleeve 191 to the right by engagement with a thin cam segment, as $C^1$, will open the ball pressure valve 192 and admit pressure to the control pipe 74, and will simultaneously permit the ball vent valve 198 to close the branch or vent pipe 197. When the cam segment $C^1$ thereafter leaves the roll 194, the outer sleeve 191 is moved to the left by the spring 193 (Fig. 10) which is larger and stronger than the spring 199, the pressure valve 192 closes and the vent valve 198 will be opened to vent the pipes 74 and 197.

In Fig. 15 I have shown the detailed structure of the main oxygen valve $V^{11}$ and the bellows operator $B^{11}$ therefor and also the nitrogen rinsing valve $V^1$ and the bellows operator $B^1$ therefor.

The main oxygen valve $V^{11}$ comprises a chamber 220 having an open connection 221 to the combustion chamber 40. The oxygen supply pipe 126 extends inward and upward within the chamber 220 and the upper inner end of the pipe 126 is normally closed by a valve member 222, mounted on the lower end of a rod 223. The upper end of the rod 223 is connected to the closed upper end of an inner cylinder 224, mounted within the fixed outer casing 225 of the bellows operator $B^{11}$ and connected thereto by a bellows member 226. A spring 227 normally forced the cylinder 224, rod 223 and valve member 222 downward to close the supply pipe 126. The lower part of the rod 223 is loosely slidable through a guide-plate 228. The reduced lower end of the bellows operator $B^{11}$ is connected to the upper end of the inner cylinder 224 by a bellows packing sleeve 229.

The control pipe 104 from the control valve $A^4$ connects to the outer casing 225 of the bellows operator $B^{11}$. When pressure is applied through the pipe 104, the inner cylinder 224 is forced upward against the spring 227, thus opening the valve member 222 and admitting oxygen to the combustion chamber 40. When the control pipe 104 is vented, the spring 227 promptly closes the oxygen supply pipe 126. It will be noted that the direction of opening of the valve member 222 is such that pump pressure in 126 will tend to open, rather than to close, this valve.

The nitrogen rinsing valve $V^1$ (Fig. 15) comprises a lower chamber 230 connected by a branch pipe 231 to the outlet 221 of the oxygen valve $V^{11}$. The valve $V^1$ also comprises an upper chamber 232 to which the nitrogen supply pipe 80 is connected. A valve 233 between the chambers 230 and 232 is normally closed by a spring 234 which is strong enough to overcome the nitrogen pressure in the pipe 80.

A plunger 235 is connected at its upper end to a plate 236 which closes the lower end of a bellows member 237 in the bellows operator $B^1$, which operator has a fixed outer casing 238 to which the upper end of the bellows member 237 is secured. A spring 239 is introduced between the plate 236 and a shoulder of the fixed casing 238 and normally lifts the plunger 235 away from the valve member 233.

The pressure or control pipe 75 from the control valve $A^1$ is connected to the space inside of the bellows member 237 through an inwardly depressed portion of the upper end of the casing 238 of the bellows operator $B^1$. When pressure is admitted through the pipe 75, the bellows operator $B^1$ overcomes the spring 239 and opens the nitrogen valve $V^1$ to admit nitrogen to the oxygen valve $V^{11}$ and its connection to the combustion chamber 40, thus rinsing these parts with nitrogen and ejecting any explosive mixture of gases therefrom. A bellows seal 240 connects the plate 236 to the upper end of the casing of the valve $V^1$ to prevent leakage of nitrogen around the plunger 235.

In Figs. 16 and 16ª, I have shown details of construction of the automatic vent valve $V^5$ for the oxygen tank 43 and of the bellows operator $B^5$ therefor. The vent valve $V^5$ has a connection 242 to the tank 43 and a vent 243 to the atmosphere. The valve $V^5$ also comprises a rotary member 244 having a diametral passage 245 therethrough and having a lug 246 movable between fixed stops 247. An arm 248 on the rotary member 244 is connected to a spring 249 by which it is held normally in the vented position shown in Fig. 16ª.

The arm 248 is connected by a cord 250 to a rod 251 (Fig. 16), the opposite end of which is connected to the closed end of an inner cylinder 252, mounted in spaced relation within the fixed casing 253 of the bellows operator $B^5$. A bellows sleeve 254 connects the cylinder 252 to the casing 253 and a spring 255 normally holds the parts in the position shown in Fig. 16.

The pressure or control pipe 97 from the control valve $A^3$ connects into the end of the casing 253 of the bellows operator $B^5$. When pressure is applied through the pipe 97, the bellows operator swings the arm 248 (Fig. 16ª) to the left, thus closing the vent of the oxygen tank 43, which is thereafter maintained closed so long as the control valve $A^3$ is operative.

In Fig. 17 I have shown the detailed construction of the solenoid control of the switch 66. The switch 66 comprises a metal plate 260 insulated from the switch lever 261 and adapted to close the circuit between the wire 262 from the battery T' and the wire 263 connected to the motor M.

The switch lever 261 has a pin and slot connection to a plunger 264 slidable in the small solenoid coil 67 and in the large solenoid coil 68, both previously described, the solenoid 68 being strong enough to move the lever 66 against the force of the solenoid 67.

The solenoid 68 acts to move the plunger to the right in Fig. 17 and to close the switch 66, while the solenoid 67 acts to open the switch if the solenoid 68 is not energized. Friction material, such as felt discs 265, are provided to retain the plunger 264 in either position to which it is shifted after a solenoid circuit has been broken, so that the switch, if closed, will remain closed until the solenoid 67 is energized and, if open, will remain open until the solenoid 68 is energized.

Figs. 18 and 19 relate to the construction of the igniter 52 for the combustion chamber 40 and have previously been fully described.

Figs. 20 and 21 show the detailed construction of the control switch 137 and the bellows operator B¹⁹ by which the motor is stopped on substantial fall of pressure in the combustion chamber 40.

The switch 137 comprises a thin resilient contact strip mounted in a fixed stud 270 which is connected to the control circuit of the solenoid 68 in parallel with the manually controlled starting switch 70. The contact strip is normally positioned midway between a contact stud 271 through which the solenoid circuit is completed and a stop pin 272. The outer end of the strip 137 is positioned for engagement by the laterally projecting hooked upper end 273 of a flat rod 274, actuated by the bellows operator B¹⁹.

This bellows operator comprises a fixed outer casing 275 connected by a pipe 276 to the combustion chamber 40 (Fig. 1) and contains a bellows member 277 fixed to the upper end plate 278 of the casing 275. A plate 279 at the lower end of the bellows member 277 is connected to the lower end of the flat bar 274, which bar extends upward through a perforated guide-plate 280 in the upper end 278 of the casing 275. A compression spring 281 holds the parts in the position shown in full lines in Fig. 20 when there is no pressure in the combustion chamber 40.

As the pressure in the combustion chamber 40 and also in the bellows operator B¹⁹ rises to operative value, the bellows member 277 is compressed and the lateral projection or hook 273 of the flat rod 274 forces the contact strip 135 upward against the stop 272 and then slips upward past the end of the strip to the position shown in dotted lines in Fig. 20.

If the pressure in the combustion chamber 40 falls substantially, due to failure of fuel supply or to failure of any part of the apparatus to function as intended, the pressure in the bellows operator 19 will decrease and the spring 281 will force the bar 274 and hook 273 downward, moving the contact strip 135 into engagement with the stud 271 and thus completing a circuit through the solenoid 68 to start the motor M and initiate the successive operations necessary to bring the apparatus to rest, all as previously described.

It is not desirable that the circuit through the switch 135 remain closed as the apparatus stops and the pressure in the combustion chamber approaches atmospheric. Accordingly I provide the flat rod 274 with a guide-pin 283 movable in a slot 284 in a fixed guide-plate 285 (Fig. 21). The lower end of the slot 284 is curved outward, as indicated at 286, so that the hook 273 is moved to the left in Fig. 20 to clear the end of the strip 135 as the hook approaches its normal inoperative or lower position.

In Fig. 22 I have shown certain details of the bellows operator B³ which actuates the main valve V³ by which oxygen is admitted to the igniter 52 from a supply pipe 290 which extends to the oxygen tank 43.

The valve V³ comprises a casing 291 forming an upward extension of the igniter 52 and having a valve member 292 movable upward to close a port in the partition 293 which separates the valve V³ from the igniter 52. The valve member 292 is actuated by a rod 295 extending upward into the bellows operator B³ and connected to a plate 296 forming the upper end of a bellows member 297. This bellows member is mounted in a casing 298 which is connected to the control valve A² by the pipe 84 previously described. A spring 299 holds the valve 292 normally closed, and a bellows sleeve 300 prevents leakage from the casing 291 around the valve rod 295.

When the control valve A² admits pressure through the pipe 84, the rod 295 and valve member 292 are depressed, thus admitting oxygen to the igniter 52.

The construction of the bellows operator B⁴ and valve V⁴ which control the flow of gasoline from the pipe 302 to the igniter is substantially the same as that of the operator B³ and valve V³ above described.

In Fig. 23 I have shown the details of construction of the double bellows contact maker which insures that external starting pressure will be supplied to the turbines 47 and 48 until the desired operating pressures are attained in the supply pipes 111 and 112 to which gasoline and oxygen respectively are delivered by the pumps 49 and 50.

This double bellows contact maker comprises duplicate bellows operators B¹⁷ and B¹⁸ (Fig. 23) respectively connected at their lower ends to the gasoline supply pipe 111 and oxygen supply pipe 112. Each operator B¹⁷ or B¹⁸ comprises a bellows member 310 having a fixed lower end plate 311 and also having a movable upper end plate 312 pivoted to one end of the contact lever 113 previously described. A tension spring 314 in each operator tends to contract the bellows operator in which it is mounted. A guide-rod 315 is loosely pivoted to the center of the lever 113 and is guided for limited vertical movement in a fixed casing 316.

When both operators B¹⁷ and B¹⁸ are expanded to correspond to predetermined pressures in the pipes 111 and 112, the movable contact 114 will engage the fixed contact 115 and complete a circuit through the large solenoid 68 and contact strip S⁶, thereby starting the motor M and thus permitting closing of the control valve A³, all as previously described.

In Figs. 24 and 25, I have shown details of construction of the control drum 60 and certain associated parts. The drum 60 is rotated by the motor M through the pinion 64 and gear 65 as previously described, and comprises an inner cylinder 60 on which the cam segments C¹ to C⁴ are mounted, and a metal cylindrical shell 61 to which the contact strips S¹ to S⁶ are connected. A sleeve 320 of insulating material separates the drum or cylinder 60 from the shell 61, and the contact strips S¹ are mounted outside of an insulating sleeve 321 but are each electrically connected to the shell 61. The metal sleeve 61 extends beyond the insulating material 321 at one end to provide contact surface for the brush 62 which is connected through the wire 63 to the battery T.

The switch 132 previously mentioned comprises a star wheel 132 (Fig. 24) pivoted on a fixed support 323 and engaged by the pin 133 once in each revolution of the drum 60. The star wheel is interposed in the circuit which controls the smaller solenoid 67 which opens the switch 66, and one finger of the star wheel normally engages a fixed spring contact 324 to close the circuit at the switch 132.

The star wheel 132 is engaged by the pin 133 just before the drum completes a revolution and is thus moved off of the contact 324, thus breaking the circuit of the solenoid 67 and leaving the switch 66 closed. As soon as the drum is started for another operation, the pin 133 advances the star wheel to engage the contact 324 and leaves these parts in operative engagement until another revolution of the drum is completed.

It is desirable to prevent the cam segments and contact strips on the drum 60 from completing circuits or operating valves during a backward or resetting movement of the drum 60. For this purpose, the drum 60 (Fig. 24) and hand wheel 138 are frictionally driven from the drum shaft, so that the drum will ordinarily turn with the shaft but may be turned relative to the shaft by the hand wheel 138 for resetting.

The drum 60 is also recessed in one end, as shown at 326 in Fig. 24, to receive a compression spring 327. A collar 328 is fixed to the drum shaft to abut the spring 327, and a second collar 329 defines the normal axial position of the drum. The engaging surfaces of the hand wheel 138 and the collar 328 provide sufficient friction to cause the drum 60 to turn normally with the drum shaft.

When resetting the drum, the operator first grasps the hand wheel 138 and shifts the drum axially against the spring 327 far enough so that the contact strips S¹ to S⁶ and the cam segments C¹ to C⁴ will be out of alignment with their associated brushes and valve actuator rolls. The drum can then be turned back to initial starting position. When released, the spring 327 will restore the drum to normal axial operating position. Resetting from any position between the initial and final positions of the drum D is accomplished in the same manner as resetting from the final position.

In Figs. 27 to 30 and 33, I have shown the detachable hose plate 102 and automatically operated detachable connections therefor. The plate 102 is provided with two pairs of oppositely disposed levers 330 having hook-shaped ends normally engaging pins 331 fixed in an associated plate 332 carried by the rocket apparatus.

The adjacent ends of the levers 330 (Fig. 28) are held in operative position by pins 333 slidable in bearings 334 (Fig. 27) on the back of the plate 102 and normally projecting through slots in the adjacent ends of the levers 330. The pins 333 are projected outward to locking position by bellows members 336 (Fig. 29) connected to the pressure pipe 98 controlled by the valve A³. A pair of levers 330 is provided at each side of the hose plate 102.

When the hose plate is attached, the pins 333 are forced manually outward against the resistance of compression springs 337 (Fig. 29), and frictionally held latches 338 are moved manually into notches 339 (Fig. 30) in the pins 333. These notches are beveled toward their inner or adjacent ends, as shown.

The latches 338 hold the plate 102 locked on the apparatus until pressure is applied through the pipe 98 to the bellows members 336, when the pins 333 are forced outward enough to cam the latches 338 out of their holding positions. The plate 102 will thereafter remain locked on the apparatus until pressure is relieved by closing the valve A³ and venting the pipe 98, whereupon the pins will be moved inward by the springs 337 and the levers 330 will be released. The plate 102 is then quickly detached from the supporting plate 332 (Fig. 26) by compression springs 340 which engage the adjacent surface of the plate 332.

Check valves 341 in the pipes 100 and 101 prevent escape of air or gas when the hose connections 100 and 101 are detached. The pipe 98 has a similar detachable connection to the bellows operator B¹⁰ but has no check valve.

Having described the method of operation of my improved control mechanism and also the details of construction of the special valves and devices used in said mechanism, it is believed that the advantages of my invention will be clearly apparent.

By the use of this control mechanism, the rocket apparatus may be started by momentary manual closing of the switch 70 and, without further attention by the operator, the control mechanism will then automatically perform the necessary sequence of predetermined steps to place the apparatus in full operation and will thereafter close down the apparatus, also in a sequence of predetermined steps, on exhaustion of fuel or oxygen supply, or on a substantial drop in pressure in the combustion chamber, due to failure of any part of the apparatus to function as designed. The provision of such control mechanism greatly facilitates the operation of rocket apparatus in successful flight, where no manual control is possible.

Where the terms "gasoline" and "liquid oxygen" are used in the specification and also in the claims, it is to be understood that these terms include other liquid fuels and other oxidizing agents which are liquid at similar low temperatures.

Having thus described my invention and the advantages thereof, I do not wish to be limited to the details herein disclosed, otherwise than as set forth in the claims, but what I claim is:

1. In a rocket apparatus, a combustion chamber, means to feed gasoline and liquid oxygen thereto, valves and connections controlling the feed of said liquids to said chamber, a supply of a very cold non-oxidizing and non-combustible liquid having a very low boiling point, and means to admit a small portion of said latter liquid to the discharge side of the oxygen valve and to its discharge connection, said liquid thereupon quickly changing to a large volume of inert gas effective to thoroughly rinse the discharge side of said valve and its discharge connection and to remove explosive gaseous mixtures therefrom.

2. In a rocket apparatus, a combustion chamber, means to feed gasoline and liquid oxygen thereto, valves and connections controlling the feed of said liquids to said chamber, a supply of liquid nitrogen, and means to admit a small portion of said liquid nitrogen to the discharge side of the oxygen valve and to its discharge connection, which liquid nitrogen thereafter quickly provides a large volume of inert gas effective to thoroughly rinse the discharge side of said oxygen valve and its discharge connection and to remove explosive gaseous mixtures therefrom.

3. In a rocket apparatus, a combustion chamber, a valve for liquid oxygen, a nitrogen valve associated therewith and connected to the discharge side of said oxygen valve, automatic means to open and again close said nitrogen valve and to thereafter open said oxygen valve immediately prior to establishment of combustion in said combustion chamber, and timing mechanism effectvie to render said automatic means operative at predetermined successive intervals.

4. In a rocket apparatus, a valve for liquid oxygen, a nitrogen valve associated therewith and connected to the discharge side of said oxygen valve, automatic means to open and again close said nitrogen valve immediately following the termination of combustion in said combustion chamber, thereby rinsing said valve and discharge connection, and timing mechanism effective to render said automatic means operative at predetermined successive intervals.

5. In a rocket apparatus, a combustion chamber, an igniter, storage tanks for gasoline and liquid oxygen, means to feed gasoline and liquid oxygen from said tanks to said chamber and to said igniter, a pair of valves controlling the feed of said liquids to said igniter, an additional pair of valves controlling the feed of said liquids to said combustion chamber, a plurality of control devices effective to render said igniter operative and to automatically actuate said separate pairs of valves successively and in predetermined sequence, and timing means effective to render said control devices operative at predetermined successive intervals, said timing means comprising a control drum making one full revolution for each complete control cycle and returning to initial position at the end of each cycle and being thereby instantly available to repeat said control cycle.

6. In a rocket apparatus, a combustion chamber, an igniter, an entrance passage connecting said igniter to said chamber, means to feed gasoline and liquid oxygen to said chamber and to said igniter, valves controlling the feed of said liquids to said chamber, control devices effective to automatically open said combustion chamber valves in predetermined sequence, and a thermostatic device located at said entrance passage and effective to render said control devices operative only after the production of a substantial igniting flame in said combustion chamber by said igniter.

7. In a rocket apparatus, a combustion chamber, an igniter, means to feed gasoline and liquid oxygen to said chamber and to said igniter, valves controlling the feed of said liquids, a control drum, a series of control valves, pressure connections through which said latter valves selectively control the operation of said gasoline and liquid oxygen feed valves, devices on said drum which directly actuate said control valves as said drum rotates, means to rotate said drum, and means to interrupt such rotation for definite periods and to thereby determine the length of successive operative steps in the starting up of said rocket apparatus.

8. In a rocket apparatus, a combustion chamber, an igniter, means to feed gasoline and liquid oxygen to said chamber and to said igniter, valves controlling the feed of said liquids, a control drum, a series of control valves and pressure connections through which said valves control the operation of said rocket apparatus, devices on said drum which selectively open and close said control valves as said drum rotates, means to rotate said drum, and means to automatically and successively stop and start said drum after an initial operative movement and on the occurrence of predetermined pressure and temperature conditions and to thereby determine the length of successive operative steps in the starting up of said apparatus.

9. In a rocket apparatus, a combustion chamber, an igniter, means to feed gasoline and liquid oxygen to said chamber and to said igniter, valves controlling the feed of said liquids, a control drum, a series of control valves and pressure connections through which said valves control the operation of said apparatus, devices on said drum which selectively open and close said control valves as said drum rotates, means to rotate said drum, and means to start and stop said drum on the occurrence of predetermined conditions, said latter means including an electric motor and means to start said motor manually or on failure of the gasoline or oxygen supply or on substantial drop in pressure in the combustion chamber.

10. In a rocket apparatus, a combustion chamber, an igniter, an entrance passage connecting said igniter to said chamber, means to feed gasoline and liquid oxygen to said chamber and to said igniter, valves controlling the feed of said liquids, a source of electricity and electrical circuits through which the combustible mixtures in said chamber and igniter are ignited, control devices effective to automatically actuate said valves and to close said circuits in predetermined sequence and in part dependent on the attainment of a predetermined temperature condition at the entrance passage to said combustion chamber, and a thermostatic device located at said entrance passage and effective to render said control devices operative on the attainment of said predetermined temperature condition.

11. In a rocket apparatus, a combustion chamber, an igniter, means to feed gasoline and liquid oxygen to said chamber and to said igniter, valves controlling the feed of said liquids, and control devices effective to automatically actuate said valves in predetermined sequence to put said rocket apparatus in operation and to thereafter close down said apparatus on failure of gasoline or oxygen supply.

12. In a rocket apparatus, a combustion chamber, an igniter, means to feed gasoline and liquid oxygen to said chamber and to said igniter, valves controlling the feed of said liquids, and control devices effective to automatically actuate said valves in predetermined sequence to start said rocket apparatus in operation and to thereafter close down said apparatus on substantial drop in pressure in said combustion chamber.

13. In a rocket apparatus, a combustion chamber, pumps to feed gasoline and liquid oxygen to said chamber, turbines to drive said pumps, a generator to provide a gas under pressure to drive said turbines, valves to control the flow of gasoline and liquid oxygen to said combustion chamber and to said generator, means to ignite a mixture of said gasoline and oxygen in said combustion chamber and in said generator, control device effective to automatically actuate said valves to energize said igniting means and to initiate operation of said generator, turbines and pumps, operation of said igniter, initial operation of said generator, turbines and pumps, and ignition and further operation of said generator taking place in the order stated but only on the occurrence of predetermined conditions of temperature and pressure, and means to determine said temperature and pressure conditions and effective to render said control devices operative or inoperative in accordance with such determination.

14. In a rocket apparatus, a combustion chamber, a gasoline pump, a pump for liquid oxygen, turbines for said pumps, an external pressure supply for said turbines, a generator to supply gas to drive said turbines, connections from said pumps to said generator, connections from said generator to said turbines, and automatic means to discontinue said external pressure supply when the pressures in the connections from both pumps to said generator and to said combustion chamber reach a predetermined point.

15. In a rocket apparatus having a combustion chamber and having a plurality of pressure-operated devices and external pressure supplies therefor, in combination, a hose plate to which said external supplies are separately connected, means to latch said plate on said apparatus, automatic means to unlatch said plate, and means responsive to the pressure in said pressure-operated devices and effective to render said unlatching means operative only after said pressures attain a predetermined minimum.

16. In a rocket apparatus having a combustion chamber and having a plurality of pressure-operated devices and external pressure supplies therefor, in combination, a hose plate to which said external supplies are separately connected, means to latch said plate on said apparatus, locking pins for said latches, frictionally positioned holding devices for said locking pins, fluid-operated means associated with said pins and effective to move said pins in one direction to release said holding devices on the occurrence of a rise in pressure coincident with starting said apparatus in operation, and additional means associated with said pins and thereafter effective to move said pins in the opposite direction to unlock said latches and to release said hose plate on the occurrence of a fall in pressure subsequent to putting said apparatus in full operation.

17. In a rocket apparatus, a control drum, a motor to drive said drum, a switch to start and stop said motor, a solenoid to open said switch, a second and stronger solenoid to close said switch, said first solenoid being effective to open said switch only when said second solenoid is inoperative but said second solenoid being effective to close said switch whether said first solenoid is operative or inoperative, and friction means to hold said switch from shifting movement when neither solenoid is operative.

ROBERT H. GODDARD.